Jan. 20, 1931.  A. F. DRAPER  1,789,581
VEHICLE TOP
Original Filed Feb. 12, 1917  4 Sheets-Sheet 1

Jan. 20, 1931.  A. F. DRAPER  1,789,581

VEHICLE TOP

Original Filed Feb. 12, 1917  4 Sheets-Sheet 3

Witnesses
Inventor
Arthur F. Draper
By
Attorneys

Jan. 20, 1931.                    A. F. DRAPER                    1,789,581
                                  VEHICLE TOP
                    Original Filed Feb. 12, 1917        4 Sheets-Sheet 4

Patented Jan. 20, 1931

1,789,581

UNITED STATES PATENT OFFICE

ARTHUR F. DRAPER, OF DETROIT, MICHIGAN

VEHICLE TOP

Refiled for abandoned application Serial No. 148,104, filed February 12, 1917. This application filed December 31, 1927. Serial No. 244,033.

The present application is a substitute for application Serial No. 148,104 which application was forfeited July 20, 1922 for failure to pay the final fee and subsequently abandoned.

This invention relates to vehicle tops and is more particularly designed in connection with motor vehicles of the roadster type having disappearing seats in the rear part or after deck thereof, which on occasion can accommodate two or more persons and as indicating an early conception of such type of roadster, reference may be had to my Patents Nos. 1,054,755, dated March 4, 1913; No. 1,067,008, dated July 8, 1913; and No. 1,114,452, dated Oct. 20, 1914. In these patents are disclosed forms of seats which are applicable to any type of roadster having a rear compartment, or deck portion which may be utilized for passenger and baggage carrying service.

Heretofore such roadsters have not been very popular because the style of top used afforded protection only for those occupying the front seat, the occupants of the rear or after deck having no protection whatsoever from the elements. Besides, the top used in connection with the roadster vehicle, when folded, projected over the rear deck or portion thereof and prevented the rear seat from being used, insomuch that the side door of the automobile body could not be used when the top was folded.

Furthermore, in the development of the roadster type of vehicle, it has been desirable to devise a top therefor which would not overhang the rear part or after deck of the car when folded; which would be invisible, or nearly so, when closed; which would shelter the occupants of the front seat without necessarily extending over the rear part of the car; a top constructed so that one person could readily either fold or open the same without stopping or leaving the car; a top that would give full protection against the elements and not rattle; a top in connection with which curtains could be always carried and instantly available to protect occupants of any or all seats of the roadster; a top in which the supporting members would offer no obstruction to vision and would not be exteriorly visible when the curtains were in operable position and would be concealed when the folded top was concealed; and finally, a top the line and contour of which could be made to harmonize with the lines of any particular vehicle body. My invention aims to meet all the above conditions.

With this outline my invention involves a top that is applicable to any type of roadster or car having a front seat, and a foldable, disappearing, or other form of seat in the rear part or after deck of the vehicle which will provide protection for the occupants of any or all seats.

My invention further aims to provide a vehicle top having foldable frames and bows, together with a one-piece cover, and the foldable frames and bows disposed to provide collapsible end portions so that either end portion of the top may be collapsed and nested relative to the other portion, thus permitting of the occupant or occupants of a vehicle using any desired portion of the top. For instance, the top as a whole may afford protection for all of the occupants of a roadster when the top is completely extended. The front portion of the top will afford protection to the occupants of the front seat of a roadster when the rear or disappearing seat is closed and the rear portion of the top nested. Or the rear portion of the top, with the front portion thereof nested, will protect the occupants of the disappearing seat in the after deck of a roadster.

My invention further aims to provide a canopy top for a vehicle, particularly a roadster that may be folded or collapsed and swung into a special compartment or receptacle provided therefor, either in proximity to the driver's seat or in the after deck or rear part of the same, and it is in this connection that I have devised novel foldable top supports that can be easily and quickly manipulated, when it is desired to erect or fold the top.

My invention further aims to provide a vehicle top, which with certain modifications may be utilized in connection with a touring car or roadster having an ordinary windshield or the V type of windshield, and which may be folded and swung into concealment in proximity to the rear seat or front seat thereof.

My invention further aims to provide a vehicle top along the lines suggested above wherein the parts are constructed with a view of reducing the cost of manufacture, and at the same time retain those features by which durability, ease of manipulation, anti-rattling, safety against pinching or injuring of cover fabric or fingers, rigidity, lightness, ease of assembling, compactness when folded, and applicability to various types of cars are secured. With this in view, my invention resides in the peculiar construction, arrangement and combination of parts all as are more fully hereinafter described and claimed.

Reference will now be had to the drawings, wherein.

By describing my invention by aid of the views above referred to, I desire to point out that the same are merely intended as illustrative of the top which I have designed and built for a roadster. The principle of moving or collapsing the top can be readily embodied in a top framework for other automobiles than a roadster or as a matter of fact for any vehicle, consequently I do not care to confine my invention to the precise construction and arrangement of parts shown. The following description is therefore to be broadly construed as including such substitute constructions and arrangement of parts which are the obvious equivalent of those to be hereinafter referred to.

As giving some idea of the applicability of the top to a roadster automobile, there is shown in Figs. 13 to 16 inclusive a roadster body 1 having the usual front seat 2. The rear portion or after deck of the body 1 is constructed to provide a compartment 4 for the luggage and occupants of a disappearing or foldable seat 5, and access is had to the compartment 4 through the medium of the side doors 6.

Figures 1, 2, 3, 4, 5, 6, 7, 8:
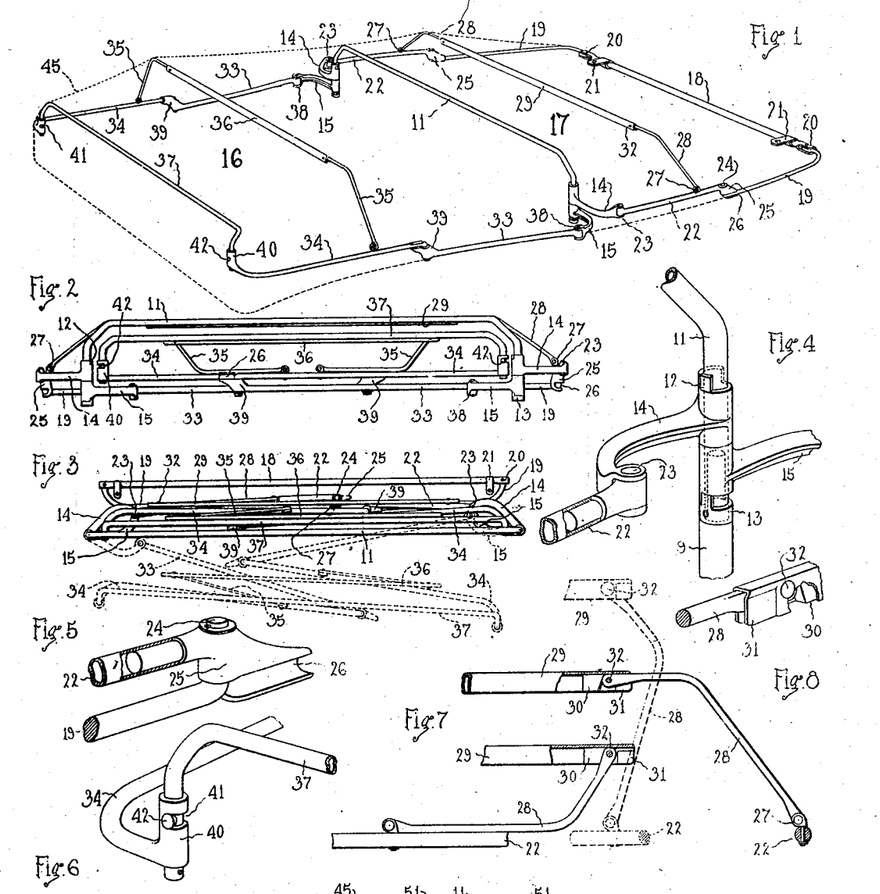
Figure 1 is a perspective view of the top framework, showing the outline of the cover or canopy in dotted lines.
Fig. 2 is a rear view of the same, showing the rear portion or section of the top nested relative to the extended front portion or section thereof.
Fig. 3 is a plan of the top framework with both end portions or sections thereof closed or nested, and showing one of the end portions or sections partly open in dotted lines.
Fig. 4 is a perspective view of a pivotal support forming part of the top framework.
Fig. 5 is a perspective view of an intermediate side stop joint.
Fig. 6 is a perspective view of a back stop joint.
Fig. 7 is an end view of a portion of the framework, partly in section, showing the manner of folding a side frame and intermediate bow.
Fig. 8 is a perspective view of an intermediate bow joint.
Figures 15, 16, 17, 18:
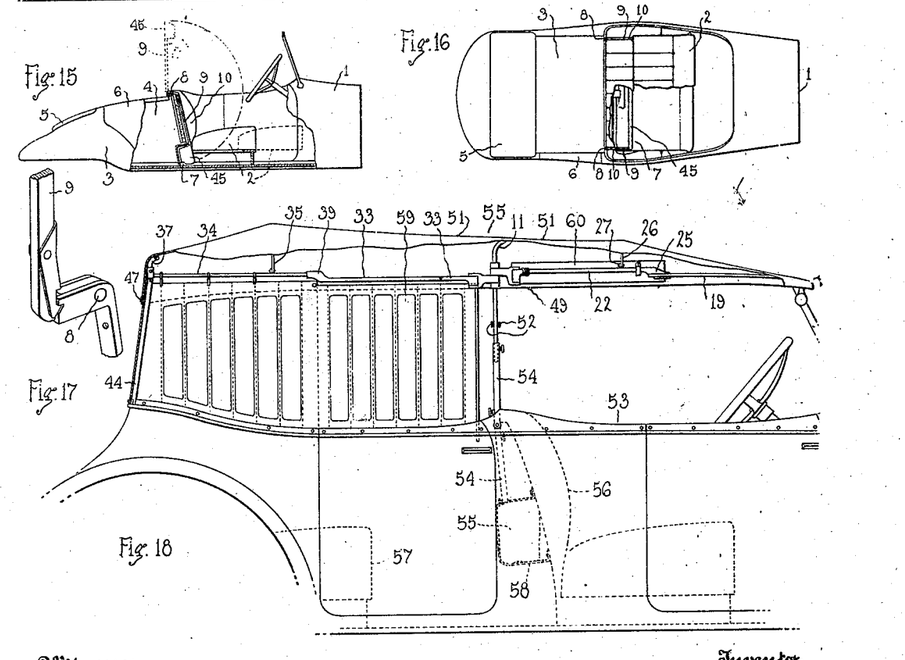
Fig. 15 is a side elevation of a roadster body, partly broken away, and partly in section, showing a compartment or receptacle at the driver's seat adapted to receive my improved top when folded or collapsed and also showing the disposal of the supports.
Fig. 16 is a plan of the same.
Fig. 17 is a perspective view of a body iron showing a portion of one of the top supports.
Fig. 18 is a side elevation of a portion of a touring car provided with a top in accordance with my invention and showing side curtains and the location of a compartment in the rear of the driver's seat that may receive the top when folded and out of use.
Figure 19:
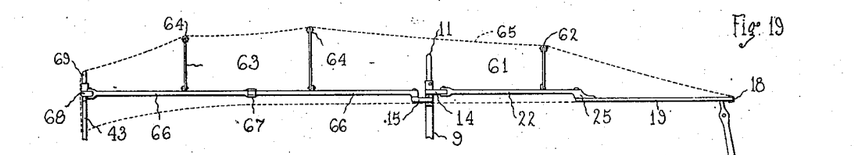
Fig. 19 is an elevation of a modified form of vehicle top framework.
Figure 20:
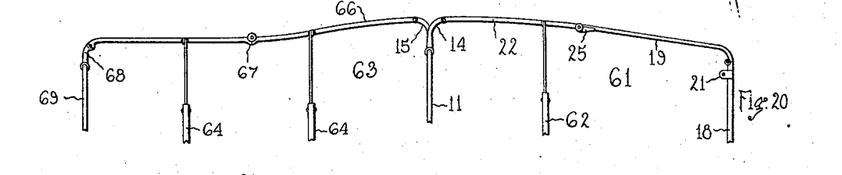
Fig. 20 is a plan of a portion of the same.
Figure 21:
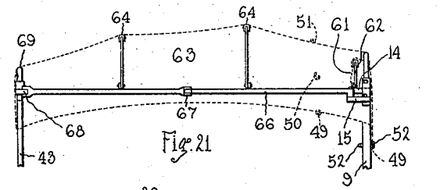
Fig. 21 is a side elevation of the same top framework, showing the rear portion or section thereof extended and the front portion or section folded.
Figure 22:
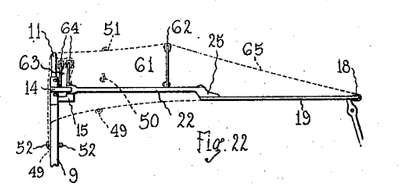
Fig. 22 is a similar view showing the front portion or section extended and the rear portion or section folded.

To permit of the disappearing seat 5 being used at all times, and at the same time have a top that may be housed within the body so as not to interfere with the design of the body, a receptacle or compartment 7 is formed at the base of the front seat 2 and by shifting the front seat as indicated by dotted lines in Fig. 15, easy access may be had to the receptacle 7 to store the top therein. Pivotally connected to the back of the front seat 2 or to the side walls of the body, as at 8, are top supports 9 of such a length as to permit the folded top to clear the steering wheel of the roadster when being swung into or out of the receptacle 7, and yet provide sufficient overhead clearance when the top is set up. The supports 9 are adapted to pass behind cushion portions 10 of a vehicle where they are practically concealed. The upper ends of the supports 9 are reduced and fitted over the reduced ends of the supports 9 is a main bow 11. The main bow 11, as well as a great many other parts of the top, is made of tubing and fixed to the socket ends of the main bow are stop members 12 and 13 for pivoted brackets 14 and 15 respectively, the brackets 14 being positioned above the brackets 15. The stop members 12 and 13 limit the horizontal and vertical movement of the brackets 14 and 15 and the said brackets 15 are associated with the rear section of the top generally designated 16, while the said brackets 14 are associated with the front section of the top, generally designated 17. Considering the front section of the top, a front bow 18 has the ends thereof slotted and shaped to receive the forward curved ends of an outer set of side frames 19, which are pivotally connected to the ends of the front bow 18, as at 20. The front bow 18 also has the usual socket or bracket members 21, so that it may be connected to a windshield. The rear ends of the outer side frames 19 are pivotally connected to the forward ends of inner side frames 22 and the rear ends of the inner side frames 22 are pivotally connected as at 23 to the brackets 14. The manner of articulating the sets of side frames 19 and 22 is best shown in Fig. 5, where it will be observed that the ends of the side frames 19 are upturned, as at 24 and pivotally mounted in joint members 25 carried by the side frames 22. The joint member 25 provides a groove or seat 26 for the side frame 19 and consequently the outward movement of the frames 19 and 22 is limited, somewhat similar to a rule joint. Furthermore, the seat or groove 26 prevents vertical displacement of the side frame 19 relative to the side frame 22.

Swiveled on the inner side frames 22, contiguous to the forward pivoted ends thereof are pivot members 27 supporting angle rods 28, and these rods form part of an intermediate bow 29. The ends of the intermediate bow 29 are provided with stops 30 and contracted or restricted portions 31. The upper ends of the angle rods 28 are pivotally mounted in the ends of the intermediate bow, with the pivots 32 so disposed that the ends of the angle rods 28 will be loose in the ends of the intermediate bow 29 for folding purposes, but when said bow is set up, the ends of the angle rods 28 engage in the contracted or restricted portions 31 of the intermediate bow, thereby holding the angle rods 28 rigid and in alinement with the plane of the intermidate bow 29.

Before considering the rear section 16 of the top framework, a résumé of the folding of the front section 17 will materially assist in understanding the remainder of the invention. The sets of outer and inner side frames 19 and 22, which contribute to the side lines of the top, can be broken inwardly thus carrying the front bow 18 rearwardly toward the main bow 11. The pivot members 27 turn upon the side frames 22 and the intermediate bow 29 is raised until the side frames 22 have been swung below the intermediate bow 29 to allow the angle rods 28 to fold downwardly on the side frames 22. This is best shown in Fig. 7 where it will be noted that the intermediate bow 29 is maintained in spaced relation to the inner set of side frames 22 and is of sufficient height relative to said side frames to readily permit it and the front bow 18 passing under the main bow 11. By reason of the brackets 14 being pivotally connected to the main bow 11, it is possible to swing the arms 22 and 19, bows 29 and 18, in under the main bow 11, as best shown in Figs. 3 and 11, thus nesting the framework of the front section of the top and at the same time affording sufficient clearance for a cover or side curtains, that will be hereinafter referred to.

The rear section 16 of the top framework is constructed very similar to the front section 17, that is, it includes sets of side frames 33 and 34, angle rods 35, and intermediate bow 36 and a rear bow 37. The inner set of side frames 33 is pivotally connected to the brackets 15, as at 38 and the rear ends of the side frames 33 are pivotally connected to the forward ends of the side frames 34 by joint members 39 corresponding to the joint member 25 at the front section of the framework, but with the joint members 39 inverted relative to the joint members 25. The connections between the intermediate bow 36, the angle rods 35 and the rear set of side frames 34 are similar to the same elements of the front section of the top framework, but the manner of connecting the rear bow 17 to the rear ends of the side frames 34 is different from the pivotal connections of the front bow 18. For instance, the rear ends of the side frames 34 are provided with vertically disposed sockets 40 which are slotted, as at 41 (see Fig. 6). Extending into the sockets 40 are the angular and depending ends of the rear bow 37 and the ends of said bow are provided with pins 42 extending into the slots 41 of the sockets 40 to limit the turning or swinging movement of the side frames 34 relative to the rear bow 37.

The rear section 16 of the top framework is folded similar to the front section 17, and by reference to Fig. 3, it will be noted that the brackets 14 and 15 permit of either the front section or the rear section of the framework being carried under the main bow 11. For instance, when the front section 17 is not in use and is nested beneath the main bow 11, then the rear section 16 in folded position, is in proximity to the folded front section, but the rear bow 37 is not beneath the main bow 11. Now, with the front section of the framework in active extended position, the rear section framework may be shifted under the main bow 11, but with the framework ready to be swung into the receptacle 7, the folded framework will be substantially as shown in Fig. 3. This arrangement has a distinct advantage in connection with the cover or canopy when one section of the top is to be used independently of the other section.

Figures 11, 12, 13, 14:
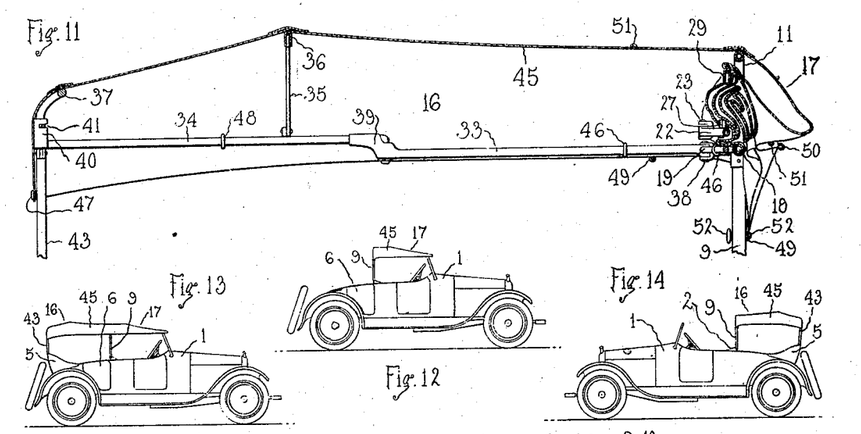
Fig. 11 is a longitudinal sectional view of the top showing the rear portion or section thereof extended, and the front portion or section thereof collapsed and nested relative to the rear portion or section.
Fig. 12 is an elevation of a roadster having a disappearing seat in the rear part or after deck thereof showing the front portion or section of my improved top in position to protect the occupants of the front seat of the roadster.
Fig. 13 is a similar view showing the disappearing seat in an open or active position, and the rear portion or section of the top extended to protect the occupants of the disappearing seat.
Fig. 14 is a similar view showing the rear portion or section of the top set up in an active position and the front section of the top folded or nested.
Figure 28:
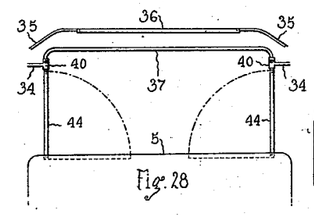
Fig. 28 is a detail view of top supports.
Figure 29:
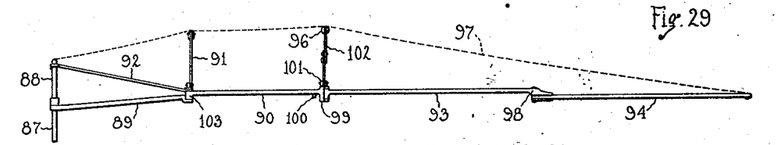
Fig. 29 is a side elevation of a further modification of my invention, showing a top framework especially designed for a touring car.
Figure 30:
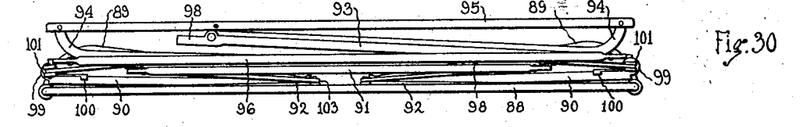
Fig. 30 is a plan of the same folded.

Supporting the rear section of the top framework, when extended, are supports 43, and as shown in Fig. 11, the upper ends of these supports may be pivoted or hinged to the depending ends of the rear bow 37, so that the supports can be swung upwardly below the rear bow and carried toward the main bow 11. The lower ends of the supports 43 may be suitably connected to the disappearig seat 5 and as a modification of this construction, there is shown in Fig. 28 supports 44 detachable relative to the rear bow and hingedly connected to the rear seat or after deck of the automobile body, so that the supports 44 may be lowered into suitable pockets provided therefor, when the rear section of the top is not in use.

Figures 9, 10:
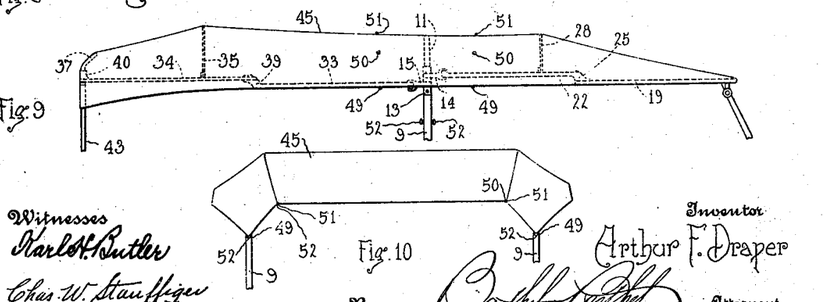
Fig. 9 is a side elevation of the vehicle top having the preferred form of framework.
Fig. 10 is an end view of the top with an end portion thereof folded or collapsed, and the cover closed.

Considering now the covers or canopies for the framework of the top reference will be had to Figs. 9, 10 and 11. The cover is supported by the bows 18, 29, 11, 36 and 37 with the sides thereof in proximity to the sets of side frames 19, 22, 33 and 34 and the side edges of the cover may be cut to impart a desired design to the top. The forward end of the cover is adapted to be buttoned or otherwise connected to the front bow 18 and the side edges of the cover adjacent the central portion thereof, are provided with eyelets 46 slidable on the inner set of side frames 22 and 33. The rear end of the cover 45 is adapted to be suitably fastened to the supports 43, as at 47, and the inner walls of the cover may have eyelets 48 slidable on the side frames 34. The cover may be reinforced or strengthened where it engages the bows 29, 11 and 36, and said cover, adjacent the main bow 11 has eyes 49, hooks 50 and eyes 51. These devices are located near the sides of the cover fore and aft the main bow 11 and are employed to retain the cover folded relative to either section. The supports 9, contiguous to the upper ends thereof, and at the front and rear sides are provided with buttons or hooks 52, and assuming that the entire top is in use, as shown in Fig. 9, and it is desired to fold the front section 17 thereof, the following is performed in connection with the cover 45. I have explained how the side frames 19 and 22 are swung inwardly and as this takes place, that portion of the cover between the main bow 11 and the intermediate bow 29 is raised, so that portion of the cover between the intermediate bow 29 and the front bow 18 may pass under the raised cover as the bows 29 and 18 may pass under the raised cover as the bows 29 and 18 are shifted beneath the main bow 11 and rearwardly thereof (see Fig. 11). The bows 18 and 29 afford a support for this portion of the cover between said bows and the side frames 19 and 22 and after this has been accomplished, the raised cover is pulled downwardly to overlap and enclose the forward end of the cover. The forward hooks and eyes 49, 50, and 51 are now in position to be brought into action. The sides of the cover 45, at the upper ends of the supports 9, can be gathered and folded inwardly, as shown in Figs. 10 and 11, and maintained in such folded, taut condition by placing the hooks 50 in engagement with the eyes 51 and the eyes 49 in engagement with the buttons 52, thus imparting a finish to the closed forward end of the top which renders the bows 18 and 29, side frames 19 and 22 invisible. The top in connection with a roadster now has somewhat the appearance, as shown in Fig. 14, and the manner of folding the cover of the rear section 17 is similar to the folding of the cover of the front section. As clearly shown in Fig. 11, the folded cover of the front section occupies a position beneath the main bow 11 and when the cover of the rear section is folded it will occupy a similar position, providing the front section of the top is set up or extended. When both of the sections of the top are folded to permit of the top being swung into the receptacle 7, the folded ends of the cover are brought into as intimate relation as possible to insure a compact structure that may be easily and safely swung into its receptacle.

Reference will now be had to Fig. 18, showing the framework and cover of a top in connection with a touring car generally designated 53. In lieu of the front one-piece supports 9, I provide telescopic or extensible supports 54, and after the top, which is generally designated 55, is folded, the top can be lowered and then swung downwardly against the back of the front seat 56 of the touring car, as shown in dotted lines. In swinging the top, it will clear the rear seat 57 of the touring car and a suitable cover or enclosure 58 may be provided to hold the folded top against the back of the front seat 56. This view of the drawings also clearly shows how suitable side curtains 59 may be suspended from or detachably connected to the side frames of the top and the sides of the touring car body, and by observing the front section of the top 55, it will be noted that side curtains 60 have been raised, rolled or otherwise arranged beneath the top ready for instant use.

In the modification shown in Figs. 19 to 22 inclusive, the front section of the top framework has a single intermediate bow 62 and the rear section 63 of the framework has intermediate bows 64 cooperating with the intermediate bow 62 in supporting a cover 65. Side frames 66 of the rear section 63 are connected by ordinary rule joints 67 and additional brackets 68 are used in the rear bows 69 to insure a more compact assembly of the rear section parts when the rear section is folded.

Figure 23:
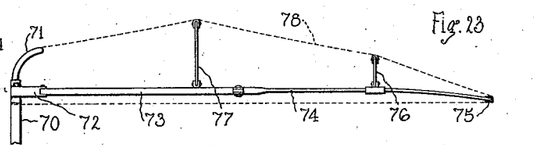
Fig. 23 is a side elevation of another modified form of top framework designed for any vehicle body.
Figure 24:
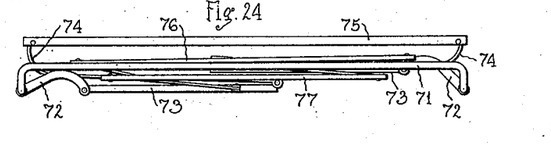
Fig. 24 is a plan of the same folded.

In Figs. 23 and 24 of the drawings there is shown a top consisting of supports 70, a rear bow 71 carried thereby, pivoted or swiveled brackets 72, articulated side frames 73 and 74 that are pivotally connected to the brackets 72 and a front bow 75, and intermediate bows 76 and 77. The former is carried by the side frames 74 and the latter by the side frames 73, and these intermediate bows cooperate with the rear bows 71, and the front bows 75 in supporting a cover 78. This type of top can be folded or collapsed as shown in Fig. 24, somewhat similar to the top previously described, and this particular form of top will afford a sedan effect in connection with an automobile body, whether used in connection with a single seat body or one having a plurality of seats, as a touring car.

Figure 25:
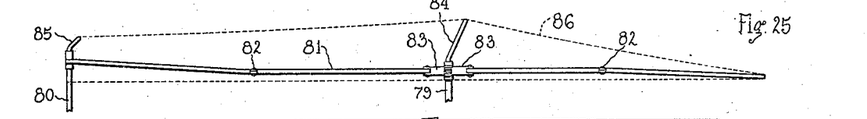
Fig. 25 is a side elevation of a further modification of my invention, showing a top framework with a minimum number of bows.
Figure 26:
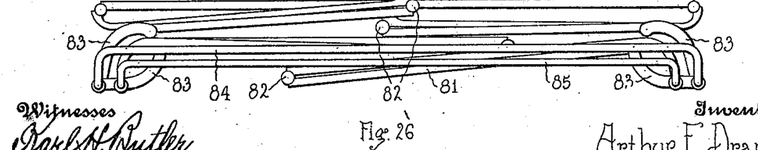
Fig. 26 is a plan of the same folded.

A further modification of my invention has been illustrated in Figs. 25 and 26, showing front supports 79, rear supports 80, side frames 81 connected by rule joints 82, brackets 83 supporting the articulated side frames, and main and rear bows 84 and 85 respectively. It is to be noted that the intermediate bows are dispensed with and a cover 86 simply supported by the rear bow 85, the main bow 84 and the forward end of the top. The manner of folding is clearly shown in Fig. 26 and the cover 86 can be readily stored on the side frames under the main bow 84 when the top is folded as is the cover 45 in Fig. 11.

Figures 31, 32, 33, 34, 35, 36:
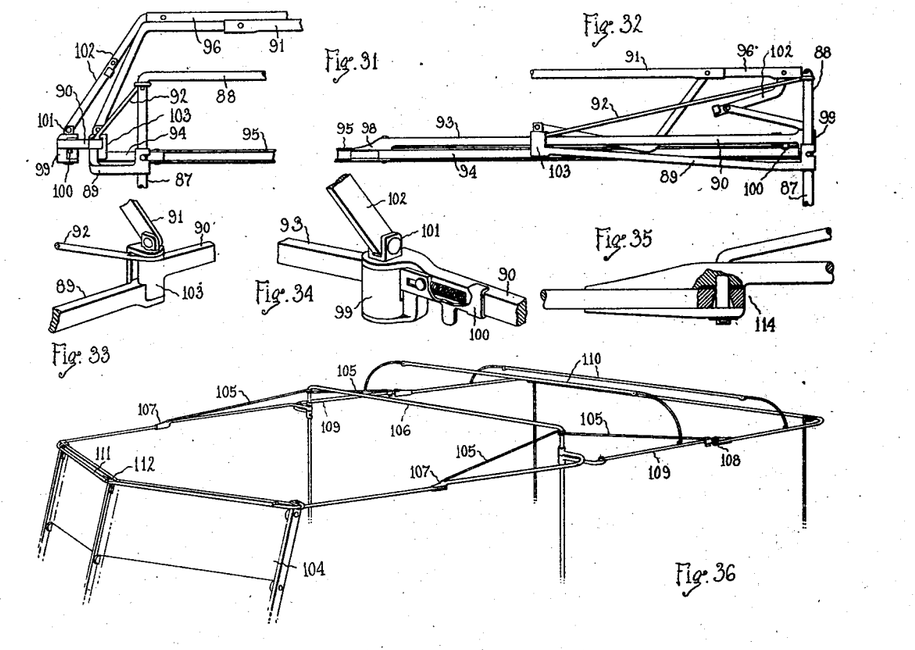
Fig. 31 is an end view of the top framework extended.
Fig. 32 is a similar view of the framework folded.
Figs. 33, 34 and 35 are detail views of various joints for a top framework.
Fig. 36 is a perspective view of a top framework designed for a vehicle body having the V shape type of windshield.

Considering Figs. 29 to 34 inclusive, there is shown a top framework that may be advantageously used in connection with touring cars or vehicles having long bodies, and the top framework comprises rear supports 87, a rear bow 88, rear side frames 89 and 90, an intermediate bow 91, angularly disposed braces 92, front side frames 93 and 94, a front bow 95, a main bow 96, and a cover 97. The front side frames 93 and 94 are connected by joint members 98, for instance, that type shown in Fig. 5, and the manner of articulating the side frames 90 and 93 is shown in Fig. 34. The joint is designated 99 and is somewhat similar to a rule joint having a limited movement in one direction. The side frame 90 is provided with a suitable latch mechanism 100 adapted to lock the rule joint 99 when the side frames 90 and 93 longitudinally aline, thus preventing accidental breaking of the joint. The pin which connects the parts of the joint together has the upper end thereof provided with a bearing 101 for toggle levers 102, best shown in Figs. 31 and 32, and it will be noted that these toggle levers can only break in one direction and are connected to the main bow 96 somewhat similar to the connections between the angle rods 28 and the intermediate bow 29, such connection being shown in Fig. 8.

The manner of articulating the ends of the side frames 89 and 90 is shown in Fig. 33, wherein 103 denotes a joint member and this member is constructed to support the intermediate bow 91 and the forward end of the brace 92. The rear end of the brace is free to turn on the rear bow 88. In view of the showing in Figs. 30, 31 and 32, and an understanding of the folding of the preferred top framework, it is thought that the manner of folding the top framework shown in Fig. 29 will be understood without further description.

Figure 37:
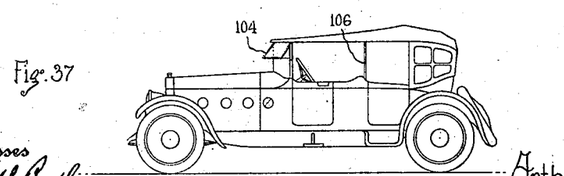
Fig. 37 is a side elevation of the same showing the cover and side curtains.

Reference will not be had to Figs. 36 and 37 showing the top framework involving principles of my invention and especially designed for an automobile having a V type of windshield 104. The top framework, besides including features heretofore mentioned has angularly disposed side braces 105 loose to turn on a main bow 106 with the ends thereof suitably connected to joint members 107 of articulated side frames. The rear set of braces 105 have the ends thereof arranged to slide on the rear side frames 109 and after the top framework is set up, the ends of the rear set of braces 105 may be fixed relative to said side frames. It is to be noted that the front section of this top framework is devoid of intermediate bows and has no pivoted brackets on the main bow, and that the front bow 111 has a stop joint 112 which permits of a more compact folding of the top. The rear section of the top is provided with intermediate bows 110, and with this construction a top of desired contour may be obtained which will harmonize with the general lines of the vehicle in connection with which it is used.

Figure 27:
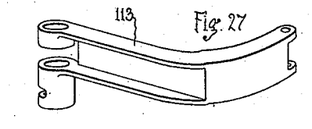
Fig. 27 is a perspective view of a modified form of joint member which may be used in connection with the preferred or modified form of top framework.

As with all vehicle tops showing a radical departure from the usual construction, it is necessary to provide special hardware, some of which has already been recognized in describing my invention, and reference will now be had to Figs. 27 and 35 showing the modification of certain hardware. In Fig. 27, there is shown a bracket 113 and this form of bracket may be used in connection with the support of the main bow shown in Figs. 23 and 25. Brackets of this type will permit of the front and rear sections of the top being more readily folded to allow the cover to fit around the upper ends of the supports, without any danger of the cover being unnecessarily creased or kinked and gives a better contour to the top when the top is extended. In Fig. 35, there is shown a joint member 114 that may be substituted for the joint member 25 so that the outer side frames of the front section of the top may have a loose movement relative to the inner side frames, especially when folding the front section of the top.

Throughout the various forms which have been illustrated and herein described it is to be understood that the covers may be suitably connected to intermediate bows or connected to any other part of the top; that the cover will be reinforced or stiffened at such points where it may receive wear or require a certain degree of rigidity to maintain a desired shape, and that suitable locking devices, as catches, snaps or the like may be utilized to properly hold the various parts of the top when set up.

I attach considerable importance to the fact that irrespective of the contour or body lines of a vehicle, that the articulated side frames may be shaped to conform to the plan outline of the vehicle body, thus affording a top which will harmonize with the vehicle body and allow the end, side and door curtains to be snugly and neatly secured and the door curtains to open with the door.

What I claim is:—

1. In a vehicle top, a main bow, front and intermediate bows, side frames supporting said front and intermediate bows relative to said main bow and having swivel and pivotal connections with said intermediate bow, the swivel connections being on said side frames and the pivotal connections set in from the ends of the intermediate bow so that the central portion of said intermediate bow will be lowered when said side frames are swung inwardly to carry said front and intermediate bows under said main bow, and a cover carried by all of said bows and adapted to have portions thereof between said main and intermediate bows overlap and enclose the remaining portion of said cover when said bows are folded.

2. In a vehicle top, a main bow, brackets carried thereby, and adapted to be swung under said bow, front and intermediate bows, side frames supporting said front and intermediate bows relative to said brackets and connected to said bows so that said side frames can be swung inwardly to carry said front and intermediate bows under said main bow with said intermediate bow between said main bow and said front bow, and a cover for said bows adapted to have that portion thereof between said main and intermediate bows overlap and inclose the remaining portions of said cover when said bows are folded.

3. The combination of an automobile body having a compartment formed behind the front seat, supports pivoted to the front seat of said automobile body, a main bow carried by said pivoted supports, pivoted brackets carried thereby, articulated side frames carried by said brackets, a front bow supported by said articulated side frames, an intermediate bow, swiveled rods carried by some of said side frames and connected to said intermediate bow and adapted to rest on said side frames and support said intermediate bow under said main bow when said top is collapsed, and a cover for said bows adapted to have a portion thereof inclose remaining portions of said cover, said collapsed top being swung by means of said pivoted supports into said compartment.

4. The combination of an automobile body having a compartment formed behind the front seat, pivoted supports attached to said body for supporting a vehicle top framework having a main bow, a front bow and an intermediate bow, means supporting said front and intermediate bows relative to said main bow so that all of said bows may be nested, said means including side frames adapted to swing inwardly, and inwardly projecting rods on said frames supporting the ends of said intermediate bow and adapted to rest on said frames in parallelism therewith to support said intermediate bow in a nested position relative to said main bow, said nested bows being swung by means of said pivoted supports into said compartment.

In testimony whereof I affix my signature.

ARTHUR F. DRAPER.